(12) United States Patent
Shimotsu et al.

(10) Patent No.: US 8,801,299 B2
(45) Date of Patent: Aug. 12, 2014

(54) HYBRID OPTICAL CONNECTOR ASSEMBLY, CABLE FOR USE WITH HYBRID OPTICAL CONNECTOR ASSEMBLY AND PLUG FOR USE WITH HYBRID OPTICAL CONNECTOR ASSEMBLY

(75) Inventors: Akihiro Shimotsu, Kanagawa (JP); Masayuki Arai, Kanagawa (JP)

(73) Assignee: Molex Incorporated, Lisle, IL (US)

( * ) Notice: Subject to any disclaimer, the term of this patent is extended or adjusted under 35 U.S.C. 154(b) by 288 days.

(21) Appl. No.: 13/383,277

(22) PCT Filed: Jul. 12, 2010

(86) PCT No.: PCT/US2010/041742
§ 371 (c)(1),
(2), (4) Date: Jun. 11, 2012

(87) PCT Pub. No.: WO2011/008712
PCT Pub. Date: Jan. 20, 2011

(65) Prior Publication Data
US 2012/0243833 A1    Sep. 27, 2012

(30) Foreign Application Priority Data

Jul. 10, 2009    (JP) ................................. 2009-163797

(51) Int. Cl.
*G02B 6/36*    (2006.01)
(52) U.S. Cl.
USPC ........................................... 385/77; 385/101
(58) Field of Classification Search
CPC ...... G02B 6/42; G02B 6/4214; G02B 6/3817; G02B 6/3879; G02B 6/3825; G02B 6/3897; G02B 6/4416; G02B 6/387; G02B 6/3849; G02B 6/3807; G02B 6/4281; G02B 6/4293; G02B 6/4448

USPC ............ 385/77, 71, 75, 101, 53, 139, 55, 92; 174/113 R; 398/82
See application file for complete search history.

(56) References Cited

U.S. PATENT DOCUMENTS

| 4,149,026 A | * | 4/1979 | Fritz et al. ...................... 174/32 |
| 5,039,195 A | | 8/1991 | Jenkins et al. |
| 5,951,322 A | * | 9/1999 | Nishikigi ...................... 439/456 |
| 6,116,791 A | | 9/2000 | Laninga et al. |

(Continued)

FOREIGN PATENT DOCUMENTS

| JP | 2003-346573 | | 12/2003 |
| JP | 2006-284925 | A | 10/2006 |

(Continued)

OTHER PUBLICATIONS

International Search Report for PCT/US2010/041742.

*Primary Examiner* — Peter Radkowski
(74) *Attorney, Agent, or Firm* — Timothy M. Morella

(57) ABSTRACT

An optical connector assembly, and both a cable and a plug for use with such an optical connector assembly, are disclosed. The optical connector assembly includes a cable having laminated therein an optical waveguide and conductive wires, a plug having the cable connected thereto, and a connector housing configured to mount thereon a plug connector. The cable is provided with a wiring portion, arranged so that a core portion of the optical waveguide and the conductive wires do not overlap with each other, and a connection end portion, arranged so that a portion of the core portion of the optical waveguide overlaps with a portion of the conductive wires.

20 Claims, 7 Drawing Sheets

(56) References Cited

U.S. PATENT DOCUMENTS

| | | | |
|---|---|---|---|
| 6,295,400 B1* | 9/2001 | Shahid | 385/114 |
| 6,386,768 B1* | 5/2002 | Yoon et al. | 385/88 |
| 6,438,301 B1* | 8/2002 | Johnson et al. | 385/101 |
| 6,623,173 B1* | 9/2003 | Grois et al. | 385/76 |
| 7,066,746 B1* | 6/2006 | Togami et al. | 439/157 |
| 2003/0165302 A1* | 9/2003 | Ngo | 385/87 |
| 2004/0178329 A1* | 9/2004 | Kare et al. | 250/227.11 |
| 2006/0093277 A1* | 5/2006 | Mulligan | 385/75 |
| 2006/0192278 A1* | 8/2006 | Furuyama et al. | 257/686 |
| 2007/0116411 A1 | 5/2007 | Benton et al. | |
| 2007/0122090 A1* | 5/2007 | Nishio et al. | 385/92 |
| 2008/0138026 A1* | 6/2008 | Yow et al. | 385/137 |
| 2008/0152286 A1* | 6/2008 | Ueno et al. | 385/101 |
| 2008/0175544 A1* | 7/2008 | Fujiwara et al. | 385/77 |
| 2009/0067779 A1* | 3/2009 | Furuyama | 385/14 |
| 2009/0130917 A1* | 5/2009 | Lloyd | 439/701 |

FOREIGN PATENT DOCUMENTS

| | | | | |
|---|---|---|---|---|
| JP | 2006284925 A | * | 10/2006 | |
| JP | 2009-086258 A | | 4/2009 | |
| JP | 2009086227 A | * | 4/2009 | |
| JP | 2009086256 A | * | 4/2009 | |
| JP | 2009086258 A | * | 4/2009 | |
| WO | WO 2009045366 A1 | * | 4/2009 | G02B 6/38 |

* cited by examiner

HYBRID OPTICAL CONNECTOR ASSEMBLY, CABLE FOR USE WITH HYBRID OPTICAL CONNECTOR ASSEMBLY AND PLUG FOR USE WITH HYBRID OPTICAL CONNECTOR ASSEMBLY

REFERENCE TO RELATED APPLICATIONS

The Present Application claims priority to prior-filed Japanese Patent Application No. 2009-163797, entitled "Optical Connector Assembly, Cable For Use With Optical Connector Assembly, And Plug For Use With Optical Connector Assembly," and filed 10 Jul. 2009, the contents of which is fully incorporated in its entirety herein.

BACKGROUND OF THE PRESENT APPLICATION

The Present Application relates generally to an optical connector assembly and both a cable and a plug for use with an optical connector assembly, and, more particularly, to an optical connector assembly having a high bendability and a small width.

In an electronic device such as a personal computer, a cellular phone, a personal digital assistant (PDA), a digital camera, a video camera, a music player, a game machine or a car navigation device, in order to realize both a decrease in an overall size of a casing thereof and an increase in the size of a display screen thereof, the casing may be configured to be collapsible. In such a case, a flexible printed circuit (FPC) and conductive wires such, as a fine coaxial cable, are arranged so as to pass through an inside of a hinge portion that allows a casing to be pivotably connected with another casing so that signals can be transmitted parallelly.

Although a signal transmission speed is increased in response an image resolution increase, since there is a limit in increasing the inside dimension of the hinge portion, it is practically impossible to arrange a conductive wire having a large width or diameter thereof. In addition, when a countermeasure against electromagnetic interference (EMI) is provided, the conductive wire will become larger in the width or diameter thereof.

In this regard, methods have been studied in which an optical waveguide capable of transmitting a large amount of signals and providing an excellent EMI countermeasure is integrated with conductive wires. One example can be found at Japanese Patent Application No. 2009-069203, the contents of which are fully incorporated herein in its entirety.

Additionally, FIG. 7 is a perspective view of a conventional cable assembly, having integrated therein conductive wires and an optical waveguide. As illustrated in FIG. 7, cable 901 includes an optical waveguide section and a conductive wire section. The optical waveguide section is provided with plurality of optical waveguide cores 911, arranged in parallel on lower base member 924, and cladding 912, formed so as to surround the surroundings of optical waveguide cores 911. The conductive wire section is provided with plurality of conductive wires 951, arranged in parallel on upper base member 923, and insulating layer 921, formed so as to surround the surroundings of conductive wires 951. Upper base member 923 is arranged on cladding 912, whereby cable 901 has a two-layer structure having the conductive wire section overlaps on the optical waveguide section.

Additionally, an end portion of cable 901 has an oblique and stair-like shape. The end portion is connected to a non-illustrated circuit board, and 45° slope surface 913 functions as a reflecting surface for optical coupling with an optical element on the circuit board. Moreover, upper surfaces 952 of conductive wires 951 function as an electrode surface bonded with the end of a conductive line which is connected to an electronic device on the circuit board. In this way, the optical waveguide section and the conductive wire section of cable 901 can be connected to the optical element and the electronic device on the circuit board, respectively.

However, since optical waveguide cores 911 and conductive wires 951 are arranged so as to overlap vertically with each other, the bendability of conventional cable 901 is low. For this reason, it is difficult for cable 901 to be used as the wiring within a small electronic device where there is little empty space and, accordingly, wiring paths become complex. Additionally, the bendability of cable 901 may be improved when the width of cable 901 is increased so that optical waveguide cores 911 and conductive wires 951 are arranged to not overlap vertically. However, when the width of cable 901 is increased, it becomes more difficult for cable 901 to be used as the wiring within a small-size electronic device or apparatus having little empty space. Particularly, when a cable-side connector is connected to the front end of cable 901 so that the cable-side connector is engaged to a board-side connector mounted on a circuit board, the width of the cable-side connector will inevitably be larger than the width of cable 901. Therefore, the overall size of a connector assembly including the board-side connector increases.

SUMMARY OF THE PRESENT APPLICATION

Therefore, it is an object of the Present Application to obviate the above-described problems encountered by the conventional optical connector assembly and to provide an optical connector assembly, and a cable and plug for use with such an optical connector assembly. The optical connector assembly is configured to include a cable having laminated therein an optical waveguide and conductive wires, a plug connected to the cable, and a connector housing configured to mount a plug connector. The cable is provided with a wiring portion, arranged so that a core portion of the optical waveguide and the conductive wires do not overlap, and a connection end portion, arranged so that a portion of the core portion overlaps with a portion of the conductive wires. As a result, the cable has a high bendability and a small width. Further, the optical connector assembly (and the cable and the plug) can be produced to have a small size and a simple structure at a low cost with high durability and good operability.

Therefore, one embodiment of an optical connector assembly according to the Present Application includes a cable having laminated therein an optical waveguide and conductive wires, a plug having the cable connected thereto, and a connector housing configured to mount thereon the plug. The cable is provided with a wiring portion, arranged so that a core portion of the optical waveguide and the conductive wires do not overlap, and a connection end portion, integral with an end portion in an axial direction of the wiring portion and arranged so that a portion of the core portion overlaps with a portion of the conductive wires. The plug is provided with a plug housing having a plug-side guide portion and holding the connection end portion so as to be unbendable. The connector housing is provided with a connector-side guide portion. The plug-side guide portion is configured to engage the connector-side guide portion to achieve positioning of the plug and the connector housing.

The optical connector assembly according to another embodiment has such a configuration that the width of the wiring portion is larger than the width of the connection end portion. The assembly according to another embodiment is configured such that the width of the plug housing is equal to the width of the wiring portion. The assembly according to another embodiment has such a configuration that the plug is provided with a plug-side optical connection portion and a plug-side electric connection portion, In this embodiment, the connector housing is provided with an optical connection portion and an electric connection portion. Further, when the plug is mounted on the connector housing, the plug-side optical and electric connection portions oppose the optical and electric connection portions, respectively.

An optical connector assembly for use with a cable according to the Present Application comprises a cable having laminated therein an optical waveguide and conductive wires, a plug connected to the cable, and a connector housing configured to mount on the plug. The cable is provided with a wiring portion, arranged so that a core portion of the optical waveguide and the conductive wires do not overlap, and a connection end portion, integral with an end portion in an axial direction of the wiring portion and arranged so that a portion of the core portion of the optical waveguide overlaps with a portion of the conductive wires. The cable for use with the optical connector assembly according to another embodiment has such a configuration that the width of the wiring portion is larger than the width of the connection end portion.

An optical connector assembly for use with a plug according to the Present Application comprises a cable having laminated therein an optical waveguide and conductive wires, a plug connected to the cable, and a connector housing configured to mount on the plug. The cable is provided with a wiring portion, arranged so that a core portion of the optical waveguide and the conductive wires do not overlap, and a connection end portion, integral with an end portion in an axial direction of the wiring portion and arranged so that a portion of the core portion of the optical waveguide overlaps with a portion of the conductive wires. The plug is provided with a housing having a plug-side guide portion and holds the connection end portion to be unbendable. The plug for use with the optical connector assembly according to another embodiment has such a configuration that the width of the plug housing is equal to the width of the wiring portion.

In accordance with the Present Application, the optical connector assembly includes the cable having laminated therein the optical waveguide and the conductive wires, the plug connected to the cable, and the connector housing mounted on a plug connector. Moreover, the cable is provided with the wiring portion, arranged so that the core portion of the optical waveguide and the conductive wires do not overlap with each other, and the connection end portion, arranged so that a portion of the core portion of the optical waveguide overlaps with a portion of the conductive wires. Due to such a configuration, the cable will have a high bendability and a small width. Accordingly, it is possible to provide an optical connector assembly, a cable for use with such an optical connector assembly, and a plug for use with such an optical connector assembly which can be produced to have a small size and a simple structure at a low cost with high durability and good operability.

BRIEF DESCRIPTION OF THE FIGURES

The organization and manner of the structure and operation of the Present Application, together with further objects and advantages thereof, may best be understood by reference to the following Detailed Description, taken in connection with the accompanying Figures, wherein like reference numerals identify like elements, and in which:

FIGS. 1A-B are views of an optical connector assembly of the Present Application, illustrating a state where a lock member is left open and a cable is maintained at its position prior to being connected, in which FIG. 1A is a perspective view of a receptacle connector and FIG. 1B is a perspective view of a plug connector;

FIGS. 4A-B are cross-sectional views of the cable of FIG. 3, in which FIG. 4A is a cross-sectional view taken along Arrows A-A and FIG. 4B along Arrows B-B;

DESCRIPTION OF THE PREFERRED EMBODIMENTS

While the Present Application may be susceptible to embodiment in different forms, there is shown in the Figures, and will be described herein in detail, specific embodiments, with the understanding that the disclosure is to be considered an exemplification of the principles of the Present Application, and is not intended to limit the Present Application to that as illustrated.

In the illustrated embodiments, directional representations—i.e., up, down, left, right, front, rear and the like, used for explaining the structure and movement of the various elements of the Present Application, are relative. These representations are appropriate when the elements are in the position shown in the Figures. If the description of the position of the elements changes, however, it is assumed that these representations are to be changed accordingly.

Figure 1B:
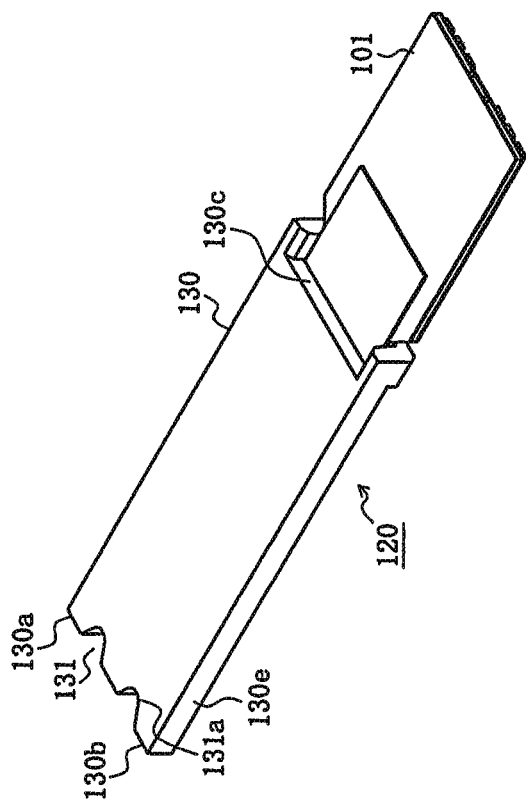
Figure 1A:
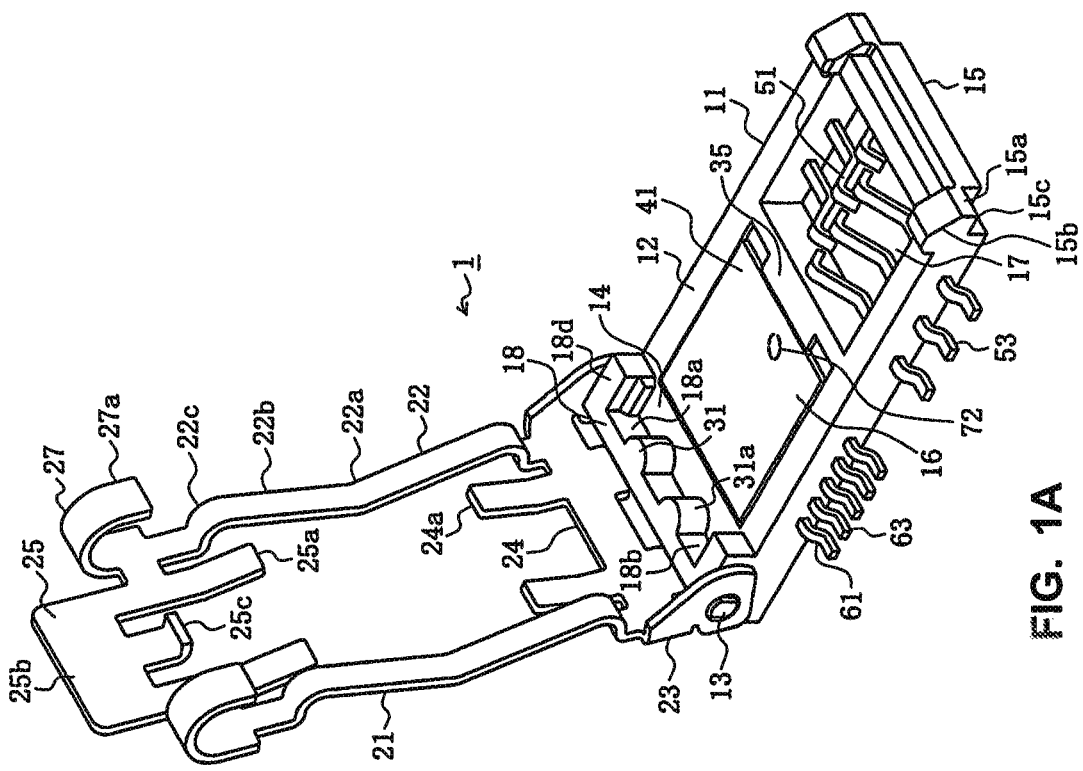

In FIGS. 1A-B, receptacle connector 1, as one of a pair of optical connectors, is preferably a board-side connector mounted on a surface of a non-illustrated board (e.g., a circuit board) and constitutes a part of an optical connector assembly for establishing a connection to cable 101. According to the Present Application, cable 101 is a combined cable having integrated therewith an optical waveguide and conductive wires 151. Specifically, cable 101 is one in which a flexible flat plate-like cable (e.g., a flexible printed circuit) is laminated onto a surface of a strip-like optical waveguide to form an integrated body, or one in which a conductive pattern is formed on a surface of a strip-like optical waveguide. Additionally, plug housing 130 is attached to an end portion of cable 101, and plug 120, as a plug connector which is a counterpart optical connector of an optical connector assembly, is formed in the end portion. Moreover, plug 120 is engaged to receptacle connector 1, whereby cable 101 is connected to receptacle connector 1.

Although the purpose of use of cable 101 is not limited, it may be suitably used, for example, in a personal computer, a cellular phone, a PDA, a digital camera, a video camera, a music player, a game machine or a car navigation device. Specifically, it may be particularly useful in an electronic device in which a casing is divided into a plurality of parts, and neighboring ones of the parts are rotatably connected, so that the cable is wired through an inside of a hinge portion that rotatably connects the neighboring parts. Moreover, cable 101 may be capable of transmitting signals through serial transmission via the optical waveguide, for example, is an excellent EMI countermeasure, and can be thus used for high-speed transmission of a large amount of signals. Furthermore, receptacle connector 1 may be used for being mounted on a surface of a board arranged within a casing of an electronic device.

Receptacle connector 1 is provided with connector housing 11, integrally formed of an insulating material, and lock member 21, integrally formed of an elastically deformable material and attached to connector housing 11 in an attitude-changeable state. Lock member 21 may be formed by processing (e.g., bending and/or pressing) a metal plate. Moreover, lock member 21 is capable of changing its attitude by having a proximal end thereof (e.g., the lower end in FIG. 1A) being rotatably connected to a distal end (e.g., the upper left end in FIG. 1A) of connector housing 11, so that it is rotated between a first, open position, as illustrated in FIG. 1A, for mounting plug 120 to connector housing 11, and a second, closed position for locking plug 120.

Lock member 21 is preferably an approximately rectangular, hollow plate-like member and includes strip plate-like first crossbar portion 24 and second crossbar portion 25, configured to extend in a short-axis direction (width direction), and pair of elongated strip plate-like flexible portions 22, configured to extend in a long-axis direction (vertical direction) so that both ends of first and second crossbar portions 24, 25 connect. Further, flexible portions 22 function as an extendable/contractible portion.

First crossbar portion 24 is disposed at a distal end of lock member 21, and proximal ends of pair of mounting leg parts 23 are connected to both ends thereof in the short-axis direction. Each mounting leg part 23 extends in a direction approximately perpendicular to first crossbar portion 24 so that a distal end thereof is rotatably connected to a distal end of connector housing 11 via rotation shaft 13 of connector housing 11. In other words, each mounting leg parts 23 is connected to one end of flexible portions 22 via first crossbar portion 24. Furthermore, proximal ends of first pressing portions 24a, configured to extend toward second crossbar portion 25, are connected between portions of first crossbar portion 24 connected to pair of flexible portions 22.

Second crossbar portion 25 is disposed at a rear end of lock member 21, and proximal ends of pair of latching arm parts 27 are connected to both ends on the rear end side in the long-axis direction. Each latching arm part 27 has a general U-shape in side view and extends in a direction away from first crossbar portion 24, and is downwardly bent so that distal end portion 27a thereof is directed toward first crossbar portion 24 engaged with or disengaged from connector housing 11. In other words, each latching arm part 27 is connected to one end of flexible portions 22 via second crossbar portion 25. Moreover, at the closed position, distal end portions 27a are latched to lock projections 15a as a latching portion of connector housing 11. Furthermore, proximal ends of second pressing portions 25a as a plug pressing portion configured to extend toward first crossbar portion 24 are connected between portions of second crossbar portion 25 connected to pair of flexible portions 22.

In addition, a proximal end of plate-like operation portion 25b extending in a direction away from first crossbar portion 24 is connected to a portion of second crossbar portion 25 disposed inner than the portions thereof connected to latching arm parts 27. Although operation portion 25b is a portion operated by an operator when an attitude of lock member 21 is to be changed, operation portion 25b may be appropriately omitted if not necessary.

In addition, proximal end of plate-like pressing portion 25c configured to extend toward the lower side is connected to the portion between two second pressing portions 25a of second crossbar portions 25. Pressing portion 25c is a member contacts with pressed portion 130c of plug housing 130, and presses plug 120 toward the distal of connector housing 11.

Moreover, each flexible portion 22 has a generally dog-leg shape in side view and is provided with bent portion 22a, bent so as to upwardly project at the closed position, flat plate-like or straight-line shaped straight portions 22b connected to both sides of bent portion 22a, and connection portions 22c connecting both ends of bent portion 22 to first crossbar portion 24 and second crossbar portion 25. Since flexible portions 22 have such a lateral shape and are formed of an elastic material, they are capable of being elastically expanded or contracted. That is, since a distance between both ends of flexible portion 22 can be increased, it is possible to increase a distance between first crossbar portion 24 and second crossbar portion 25. Specifically, when bent portion 22a is downwardly pressed at the closed position, the degree of bending of bent portion 22a is decreased and thus an angle between straight portions 22b at both sides thereof is increased, and as a result, the distance between both ends of flexible portion 22 is increased. That is, flexible portion 22 is expanded or contracted in accordance with a change in the degree of bending of bent portion 22a.

Connector housing 11 is a plate-like member having a generally rectangular shape in top plan view and is provided with pair of sidewall portions 12 extending in the long-axis direction and rear-end wall portion 15 extending in the width direction at a rear end thereof so as to connect sidewall portions 12 at both sides thereof. Connector housing 11 is further provided with guide portion 14, optical connection portion 16 and electric connection portion 17 being arranged in tandem in the long-axis direction from a distal end thereof toward the rear end. Rotation shaft 13 is attached in the vicinity of a distal end of sidewall portions 12, and mounting leg parts 23 of lock member 21 are rotatably attached to rotation shaft 13.

Opposite sidewall portions 12 are connected with each other, at the distal end thereof, by guide portion 14 while they are connected with each other, at a middle thereof, by partition wall portion 35 extending in the width direction so as to partition optical connection portion 16 and electric connection portion 17. Moreover, in the vicinity of both ends in the width direction of rear-end wall portion 15; that is, in rear end surfaces of opposite sidewall portions 12, lock projections 15a as a latching portion projected rearward are formed. When lock member 21 is position at the closed position, distal end portions 27a of latching arm parts 27 are engaged with lock projections 15a so that lock member 21 is latched to connector housing 11. As a result, plug 120 is locked. Moreover, since the upper surfaces of lock projections 15a are configured as tapered surfaces 15b that are downwardly sloped toward a rear side so that distal end portions 27a can be easily slid on the upper surfaces. Furthermore, concave portions on the lower surface sides of lock projections 15a are configured as concave latching portions 15c so that distal end portions 27a can be firmly latched. Lock projections 15a may be formed on side surfaces of opposite sidewall portions 12.

Guide portion 14 is provided with a flat upper surface as a guide surface and abutting portion 18 as a positioning portion configured to upwardly project from the upper surface. Abutting portion 18 is a wall-like portion which is integrally formed at a front end of guide portion 14 so as to extend in the width direction, and is configured to be engaged with front end portion 130a as a front portion of plug housing 130. Rear end portion 18a as a positioning end of abutting portion 18 opposes a front end portion of plug 120; that is, front end portion 130a of plug housing 130. Abutting portion 18 is formed with guiding sidewall portions 18d as sidewall portions extending toward the rear side, which are formed at both ends in the width direction thereof. The inner walls of guiding sidewall portions 18d function as guiding sidewalls and guide plug 120. Guiding sidewall portions 18d are formed to be integral with sidewall portions 12, and rotation shaft 13 is specifically attached to guiding sidewall portions 18d.

Moreover, abutting portion 18 is formed with convex portions 31 which have a sector-like shape and are configured to rearwardly project from rear end portion 18a. In the example illustrated in the drawing figures, although convex portions 31 have a sector-like shape having a center angle of about 180°; i.e., an approximately semicircular shape, the shape thereof is not particularly limited. That is, as long as convex portions 31 have circular arc-shaped end portion 31a having an approximately circular arc shape, they do not necessarily have a semicircular or sector-like shape but may have an arbitrary shape. Moreover, in the example illustrated in the drawing figures, although flat portions 18b are formed into a straight-line shape, it does not need to be a straight line in a strict sense of meaning but it may be a smooth curve.

On the other hand, concave portion 131 configured to be engaged with convex portion 31 is formed in front end portion 130a of plug housing 130 of plug 120. In the example illustrated in the drawing figures, although concave portion 131 is opened to front end portion 130a and has a triangular shape or a generally V shape having two oblique side portions 131a, which are inclined in mutually opposite directions with respect to a straight line parallel to the long-axis direction of plug 120, the shape of concave portion 131 is not particularly limited. That is, as long as concave portion 131 is opened to front end portion 130a and has at least portions flat portions 130b being present at both sides thereof and two oblique side portions 131a which are inclined in mutually opposite directions with respect to a straight line parallel to the long-axis direction of plug 120, thus allowing at least a portion of convex portion 31 to be inserted therein, it does not need to have a triangular shape or a generally V shape, but may have a trapezoidal shape, for example, and have an arbitrary shape.

When convex portion 31 of abutting portion 18 is engaged with concave portion 131 of plug housing 130, plug 120 mounted on connector housing 11 can be guided to a predetermined position with high accuracy. Hence, the positioning of plug 120 relative to receptacle connector 1 is carried out with high accuracy.

Moreover, at this time, front end portion 130a and neighboring portions thereof in side face portions 130e of plug housing 130 are guided to guiding sidewalls 18e of guiding sidewall portions 18d, whereby the rough positioning in the width direction of connector housing 11 and plug 120 can be carried out in an easy manner. That is, by moving front end portion 130a of plug housing 130 and the neighboring portions thereof to be positioned between guiding sidewall portions 18d on both sides thereof, the brief positioning between connector housing 11 and plug 120 can be achieved. In this way, the positioning between connector housing 11 and plug 120 can be carried out in an easy manner with high precision by the engagement between convex portions 31 and concave portions 131. In the present embodiment, side face portions 130e and front end portion 130a including concave portions 131 are configured to function as a plug-side guide portion. Moreover, abutting portion 18 including convex portions 31 is configured to function as a connector-side guide portion. Furthermore, plug 120 is a thin plate-like member having an approximately rectangular shape in top plan view, and when plug 120 is mounted on connector housing 11, a lower surface thereof opposes an upper surface of connector housing 11.

In addition, optical connection portion 16 is a portion that performs transferring of light to the optical waveguide of cable 101 and is configured as a concave portion capable of receiving therein an optical device such as a control IC or the like as a light receiving/emitting control device (not shown) which is provided with optical semiconductor device 72; e.g., a light receiving element and a light emitting element, and a control circuit for controlling optical semiconductor device 72. In the example illustrated in the drawing figures, an upper surface of the concave portion is sealed by thin plate-like sealing plate 41 which is formed of a translucent material such as glass.

Moreover, optical connection portion 16 receives therein optical terminals 61 which are formed of a conductive material such as metal and connected to optical semiconductor device 72 or the control IC. Optical terminals 61 are provided with tail portions 63 as board connection portions, which are connected, by soldering or the like, to connection pads formed on a surface of a board, and tail portions 63 are projected outward from the lateral surfaces of connector housing 11.

Furthermore, electric connection portion 17 is a portion which is electrically connected to conductive wires 151 of cable 101, and is configured as a concave portion which is capable of receiving therein electric connection terminals 51 formed of a conductive material. Electric connection terminals 51 are provided with contact portions that are formed in the vicinity of free ends thereof and are curved so as to be convex toward upper side and tail portions 53 as a board connection portion connected, by soldering or the like, to connection pads formed on a surface of a board, so that tail portions 53 are projected outward from the lateral surfaces of connector housing 11.

Figure 2:
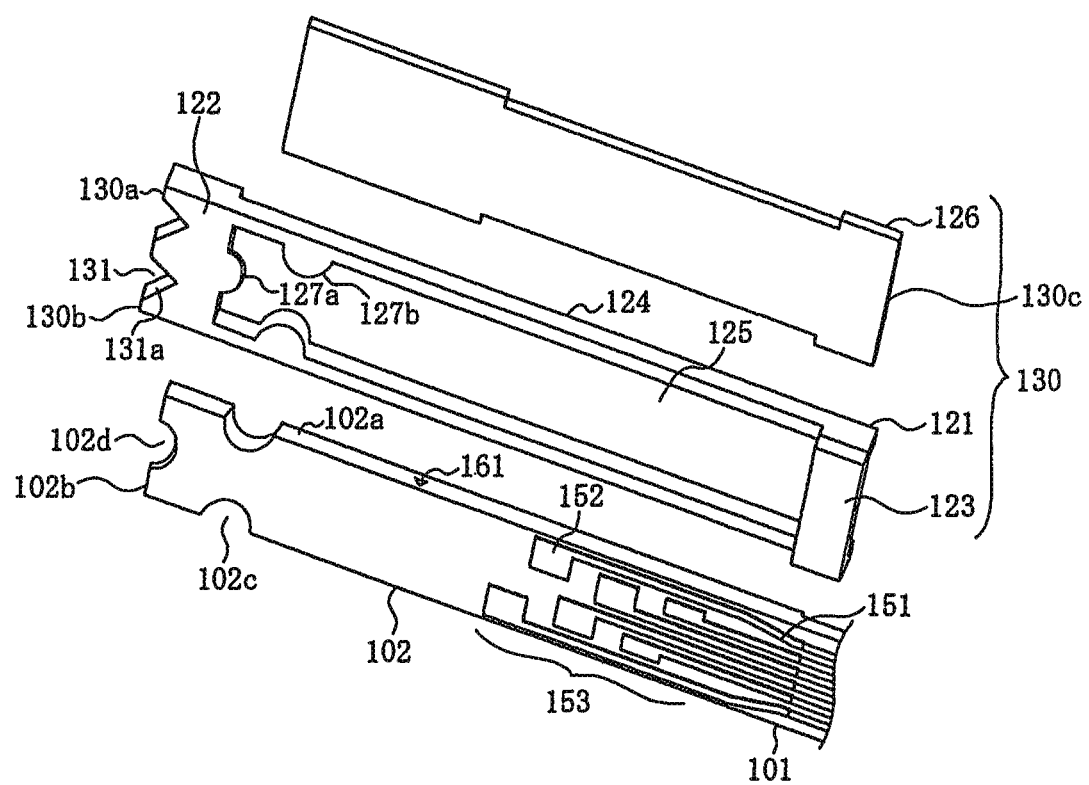
FIG. 2 is an exploded perspective view of a plug of the Present Application.

Next, a detailed description of the structure of plug 120 will be provided. Although cable 101 is a thin plate member having an elongated strip shape, only a portion in the vicinity of a front end thereof (left end in the drawing figure) is illustrated in FIG. 2. Moreover, connection end portion 102 is formed within a range of a predetermined length from front end surface 102b thereof.

On the lower surface of cable 101, a plurality of lines of foil-like conductive wires 151 formed of a conductive material such as metal is arranged in parallel with one another at a predetermined pitch on later-described first insulating layer 141 of cable 101. Moreover, later-described second insulating film 142 is covered on a lower side of conductive wires 151. Furthermore, second insulating film 142 is removed in connection end portion 102 so that the lower surface of conductive wires 151 is exposed.

In addition, connection pad portions 152 having a large width are formed at distal ends of respective conductive wires 151. Respective connection pad portions 152 are formed at positions corresponding to the contact portions of electric connection terminals 51 received in electric connection portion 17 of connector housing 11 in a state where cable 101 is connected to receptacle connector 1. Moreover, a portion within the range, where connection pad portions 152 are arranged, functions as plug-side electric connection portion 153. Although connection pad portions 152 may be arranged in an arbitrary form, it is preferable that they are arranged in a zigzag form, and arranged in tandem in an axial direction of cable 101, as illustrated in the drawing figures. Owing to this configuration, it is possible to arrange a number of connection pad portions 152 without needing to increase the width of connection end portion 102, and as a result, it is possible to suppress any increase in the width dimension of plug 120. When conductive wires 151 have a sufficiently large width, it is not necessary to form large-width connection pad portions 152, but it is possible to allow distal ends of conductive wires 151 to function per se as connection pad portions 152.

Moreover, at a portion of connection end portion 102 disposed closer the front end than connection pad portions 152, optical path conversion portion 161 as a plug-side optical connection portion is formed. Optical path conversion portion 161 is provided with later-described slope surface 162 functioning as a mirror surface and is capable of changing a direction of light transmitted from the optical waveguide to about a right angle. That is, optical path conversion portion 161 changes an optical path extending in an axial direction of cable 101 to an optical path extending in a direction perpendicular to the lower surface of cable 101. Owing to this configuration, light transmitted through the optical waveguide can be emitted toward the lower side from the lower surface of cable 101, and light incident onto the lower surface of cable 101 from the lower side can be introduced to the optical waveguide. Optical path conversion portion 161 is formed at a position corresponding to optical semiconductor device 72 received in optical connection portion 16 of connector housing 11 in a state where cable 101 is connected to receptacle connector 1.

Plug housing 130 includes plug housing body 121 which is a rectangular frame-shaped member configured to be extended in the axial direction of cable 101 and plug top plate 126 which is a rectangular plate-like member configured to be extended in the axial direction of cable 101. Plug housing 130 is configured to hold connection end portion 102 of cable 101 so as to be unbendable. Plug housing body 121 is a member integrally formed of an insulating material such as synthetic resin and is provided with pair of sidewall portions 124 extending in the long-axis direction, front crossbar portion 122 configured to connect front ends of sidewall portions 124 with each other, and rear crossbar portion 123 configured to connect rear ends of sidewall portions 124 with each other. Moreover, a rectangular opening 125, penetrating through plug housing body 121 in a thickness direction thereof, has a perimeter thereof defined by sidewall portions 124, front crossbar portion 122 and rear crossbar portion 123.

The dimension in the thickness direction of sidewall portions 124 is identical to a dimension in the thickness direction of connection end portion 102 of cable 101. Moreover, sidewall portions 124 determine the position in the width direction of cable 101.

Moreover, front crossbar portion 122 functions as a positioned portion of plug 120 and is configured as a rectangular plate-like member having a rectangular sectional shape, being provided with a flat lower surface as a guided surface and front end portion 130a as the positioning end. Moreover, concave portion 131 is formed in front end portion 130a. Front crossbar portion 122 functions as a guided portion when plug 120 is mounted on connector housing 11, concave portion 131 is engaged with convex portion 31 of connector housing 11, while front end portion 130a opposes rear end portion 18a of abutting portion 18 of connector housing 11, and the lower surface of front crossbar portion 122 opposes an upper surface of guide portion 14 of connector housing 11. Moreover, the lower surface of front crossbar portion 122 is formed so as to be even with the lower surface of sidewall portions 124.

Furthermore, plug frontward convex portion 127a is formed on the rear end surface of front crossbar portion 122 to engage cable frontward concave portion 102d, formed on front end surface 102b of connection end portion 102 of cable 101. When cable frontward concave portion 102d and plug frontward convex portion 127a are engaged together, the positioning in the width direction of connection end portion 102 of cable 101 relative to plug housing 130 is achieved. Moreover, plug laterally convex portions 127b are formed on the inner side surfaces of left and right side wall portions 124 so as to be engaged with cable laterally concave portions 102c which are formed on side surfaces 102a of cable 101. When cable laterally concave portions 102c and plug laterally convex portions 127b are engaged together, the positioning in the longitudinal direction (axial direction) of cable 101 relative to plug housing 130 is achieved. The thickness dimension of front crossbar portion 122 is approximately equal to the sum of the thickness dimension of side wall portions 124 and the thickness dimension of plug top plate 126.

Rear crossbar portion 123 is a rectangular plate-like member having a rectangular sectional shape and is provided with a flat upper surface, being configured such that an upper surface thereof is brought into tight contact with the lower surface of connection end portion 102 of cable 101, so that cable 101 is supported from the lower side. Rear crossbar portion 123 is connected to sidewall portions 124 so that the upper surface thereof is at the same surface as the lower surface of sidewall portions 124. Therefore, the rear end surface of plug housing body 121 has an approximately U-shape as viewed from a rear side thereof.

Moreover, plug top plate 126 is an approximately rectangular thin plate-like member and is fixed by being attached to plug housing body 121 so that opening 125 is blocked from the upper side. In the example illustrated in the drawing figures, although plug housing body 121 and plug top plate 126 are formed to be separated from each other, plug housing body 121 and plug top plate 126 may be integrally formed therewith. Furthermore, it is preferable that plug top plate 126 functions as a shielding plate. For example, it is preferably configured as one formed of a metal plate, one obtained by over-molding a metal plate with synthetic resin, one formed of a laminated composite plate containing a metal layer, or one formed of a conductive composite material in which a conductive material such as metal or carbon is mixed into a matrix of synthetic resin or the like.

In addition, the length of plug top plate 126, that is, a dimension thereof in the long-axis direction, is substantially the same as a dimension of plug housing body 121 as measured from the rear end surface of front crossbar portion 122 to the front end surface of rear crossbar portion 123. Moreover, the width of plug top plate 126, that is, a dimension thereof in the short-axis direction, is substantially the same as a dimension of plug housing body 121 as measured from an outer surface of one sidewall portion 124 to an outer surface of the other sidewall portion 124.

The rear end surface of plug top plate 126 functions as pressed portion 130c of plug housing 130, so that when lock member 21 is moved to the closed position, pressed portion 130c is brought into tight contact with pressing portion 25c to be pressed toward the distal end of connector housing 11. For this reason, the entire body plug 120 is pressed toward the distal end of connector housing 11 by lock member 21.

When plug top plate 126 is fixed to plug housing body 121 so that the front end surface of plug top plate 126 is brought into tight contact with the rear end surface of front crossbar portion 122, the assembly of plug housing 130 is completed. In this case, the whole surface of opening 125 and the upper surface of sidewall portions 124 are covered by plug top plate 126. Moreover, when plug housing body 121 and plug top plate 126 are integrally formed therewith, plug top plate 126 is originally attached to plug housing body 121. In assembled plug housing 130, the upper surface of front crossbar portion 122 is at the same surface as plug top plate 126.

Next, the detailed description of the structure of the cable 101 will be provided. As illustrated in FIG. 4B, cable 101 according to the present embodiment includes optical waveguide section 110 functioning as an optical waveguide and conductive wire section 150 that includes conductive wires 151 and is laminated on optical waveguide section 110. Optical waveguide section 110 is provided with core portions 111 that extend in the axial direction of cable 101 to serve as a light transmission path through which light can be transmitted, plate-like cladding portion 112 configured to surround core portions 111, and backing films 113 bonded to both upper and lower surfaces of cladding portion 112. In the example illustrated in the drawing figure, although the number of core portions 111 is two, the number may be one or three or more and may be set arbitrarily. Moreover, backing films 113 may be appropriately omitted.

Moreover, although a transmission mode of optical waveguide section 110 may be any one of a single mode and a multi mode, in this example, it is a single mode. Furthermore, a refractive index of clad portion 112 is preferably set to a value lower than a refractive index of core portion 111. Furthermore, core portion 111 and clad portion 112 may be formed of any kinds of materials as long as they can satisfy the above-mentioned refractive index requirements. For example, core portion 111 and clad portion 112 may be formed of a silicon substrate, a glass substrate, or a flexible resin film. In this specification, a description of an example where core portion 111 and clad portion 112 are formed of a flexible resin film will be provided.

Backing film 113 is formed of any material having flexibility, a light transmission property and an insulation property. Here, backing film 113 is a film formed of polyimide. Since backing film 113 has a light transmission property, the light passes through backing film 113 so as to be emitted toward a region underneath the lower side of optical waveguide section 110 or alternatively so as to be made incident to the lower side of optical waveguide section 110 from the outside. Conductive wire section 150 is, for example, a flexible circuit board, which is called FPC. Conductive wire section 150 is provided with first insulating layer 141, a plurality of foil-like conductive wires 151, which is arranged on first insulating layer 141 in parallel with each other at a predetermined pitch so as to extend in the axial direction of cable 101, second insulating layer 142, which is arranged on conductive wires 151, and filling layer 143 which exhibits electrically insulating properties and fills a space between first insulating layer 141 and second insulating layer 142 other than conductive wires 151. Filling layer 143 may be appropriately omitted. Moreover, conductive wire section 150 is not necessarily the flexible circuit board but conductive wires 151 may be directly bonded to optical waveguide section 110 and second insulating layer 142 may be bonded thereon.

Figure 4A:
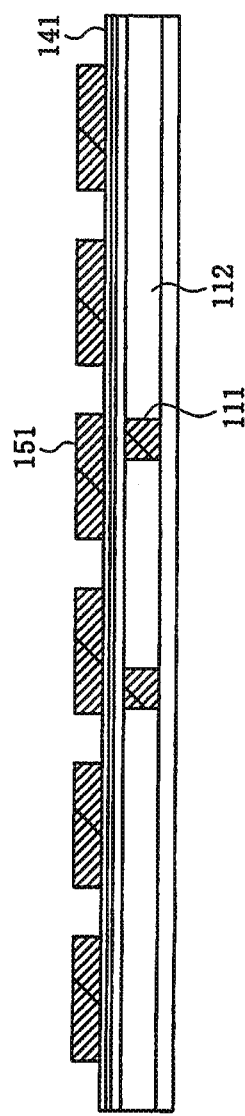
Figure 4B:
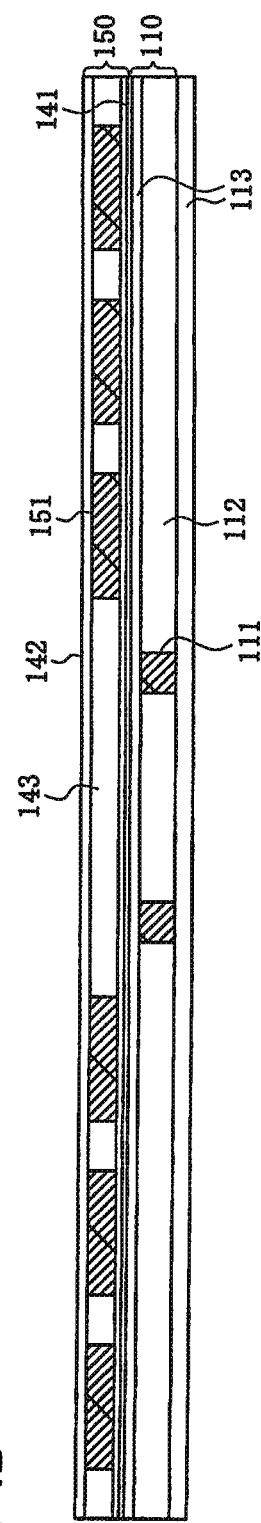

As illustrated in FIG. 4A, second insulating layer 142 and filling layer 143 are removed in connection end portion 102 so that a corresponding portion of conductive wires 151 is exposed. As will be clearly understood from comparison between FIGS. 4A and 4B, in connection end portion 102, the width of cable 101 and the pitch of conductive wires 151 decreases, and at least a portion of core portions 111 and at least a portion of conductive wires 151 are arranged so as to overlap with each other (in the example illustrated in FIG. 4A, two core portions 111 and two central conductive wires 151 overlap with each other). On the other hand, in portions other than connection end portion 102, namely the wiring portion, the width of cable 101 and the pitch (in the example illustrated in FIG. 4B, the gap between two central conductive wires 151) of conductive wires 151 increases, and core portions 111 and conductive wires 151 are arranged so as not to overlap with each other.

As described above, in the present embodiment, since in the wiring portion, the pitch of part of conductive wires 151 is great, and core portions 111 and conductive wires 151 are arranged so as not to overlap with each other, it is possible to increase the bendability of cable 101. Moreover, in connection end portion 102 which is connected to an end portion in the axial direction of the wiring portion, at least a portion of core portions 111 and at least a portion of conductive wires 151 are arranged so as to overlap with each other, it is possible to make the width of cable 101 smaller than in the wiring portion.

The mode of bending cable 101 can be classified into two cases: one is where optical waveguide section 110 becomes an inner surface of a bent structure and conductive wire section 150 becomes an outer surface of the bent structure; and the other is where optical waveguide section 110 becomes the outer surface of the bent structure and conductive wire section 150 becomes the inner surface of the bent structure. In the cross section of cable 101 illustrated in FIGS. 4A and 4B, tensile stress acts on the outer surface of the bent structure and compressive stress acts on the inner surface of the bent structure. Moreover, in the cross section, specifically in the middle of a portion where the tensile stress acts and a portion where the compressive stress acts, the tensile stress and the compressive stress are balanced, so that a position occurs where the total stress becomes zero. Such a position will be referred to as the center of bending. The center of bending can also refer to a position corresponding to the neutral axis which is used in calculating the stress of a combined beam or the like in the field of material mechanics.

However, in conductive wire section 150, the rigidity of conductive wires 151 is larger than the rigidity of other members such as first insulating layer 141 or the like, and in optical waveguide section 110, the rigidity of core portions 111 is larger than the rigidity of other members such as cladding portion 112 or the like. For this reason, it may be reasonable to pay attention to conductive wires 151 for examining the stress acting on conductive wire section 150 and to core portions 111 for examining the stress acting on optical waveguide section 110.

In the following description, the case will be described where optical waveguide section 110 becomes the inner surface of the bent structure and conductive wire section 150 becomes the outer surface of the bent structure. In such a case, tensile stress acts on conductive wires 151. The tensile stress acting on conductive wires 151 increases as the distance of conductive wires 151 from the center of bending increases and decreases as the distance decreases. That is to say, it may be preferable to move the center of bending closer to conductive wires 151 in order to decrease the tensile stress acting on conductive wires 151 to increase bendability. As described above, the center of bending is located in the middle of the portion where the tensile stress acts and the portion where the compressive stress acts, namely, a position where the tensile stress and the compressive stress are balanced so that the total stress becomes zero. Thus, if the rigidity of optical waveguide section 110, which is the portion where the compressive stress acts, is low, then, the center of bending is located close to conductive wires 151. Therefore, as illustrated in FIG. 4B, as long as core portions 111 are not present in a portion of optical waveguide section 110 opposing conductive wires 151, then, it is possible to make sure that the rigidity of the corresponding portion is low and the center of bending is located close to conductive wires 151.

On the other hand, compressive stress acts on core portions 111. The compressive stress acting on core portions 111 increases as the distance of core portions 111 from the center of bending increases and decreases as the distance decreases. That is to say, it may be preferable to move the center of bending closer to core portions 111 in order to decrease the compressive stress acting on core portions 111 to increase the bendability. Moreover, if the rigidity of conductive wire section 150, which is the portion where the tensile stress acts, is low, then, the center of bending is located close to core portions 111. Therefore, as illustrated in FIG. 4B, as long as conductive wires 151 are not present in a portion of conductive wire section 150 opposing core portions 111, then, it is possible to make sure that the rigidity of the corresponding portion is low and the center of bending is located close to core portions 111.

Therefore, as illustrated in FIG. 4B, when core portions 111 and conductive wires 151 are arranged so as not to overlap with each other, in a range of areas in the vicinity of the center of cable 101 where core portions 111 are present but conductive wires 151 are not present, the center of bending will be located close to core portions 111 and thus the bendability of cable 101 will be high. On the other hand, in areas located at the further outer side where conductive wires 151 are present but core portions 111 are not present, the center of bending will be located close to conductive wires 151 and thus the bendability of cable 101 will be high. That is to say, the overall bendability of cable 101 will become high.

In the case where optical waveguide section 110 becomes the outer surface of the bent structure and conductive wire section 150 becomes the inner surface of the bent structure, since only the portion where the compressive stress acts and the portion where the tensile stress are switched, and other things remain the same as in the case where optical waveguide section 110 becomes the inner surface of the bent structure and conductive wire section 150 becomes the outer surface of the bent structure, the description will be omitted.

As described above, since cable 101 has a wiring portion having high bendability, even when cable 101 is used in an electronic device or apparatus in which a casing is divided into a plurality of parts, and neighboring ones of the division parts are rotatably connected with each other, such that cable 101 is wired so as to pass through the inside of a hinge portion that rotatably connects the respective neighboring division parts, the wiring operation is facilitated, and thus it is possible to perform the wiring operation in a simple manner. Moreover, even when cable 101 is bent, since core portions 111 and conductive wires 151 will not receive great stress, core portions 111 and conductive wires 151 will not be damaged, and moreover, occurrence of optical loss in optical waveguide section 110 can be prevented.

Figure 3:
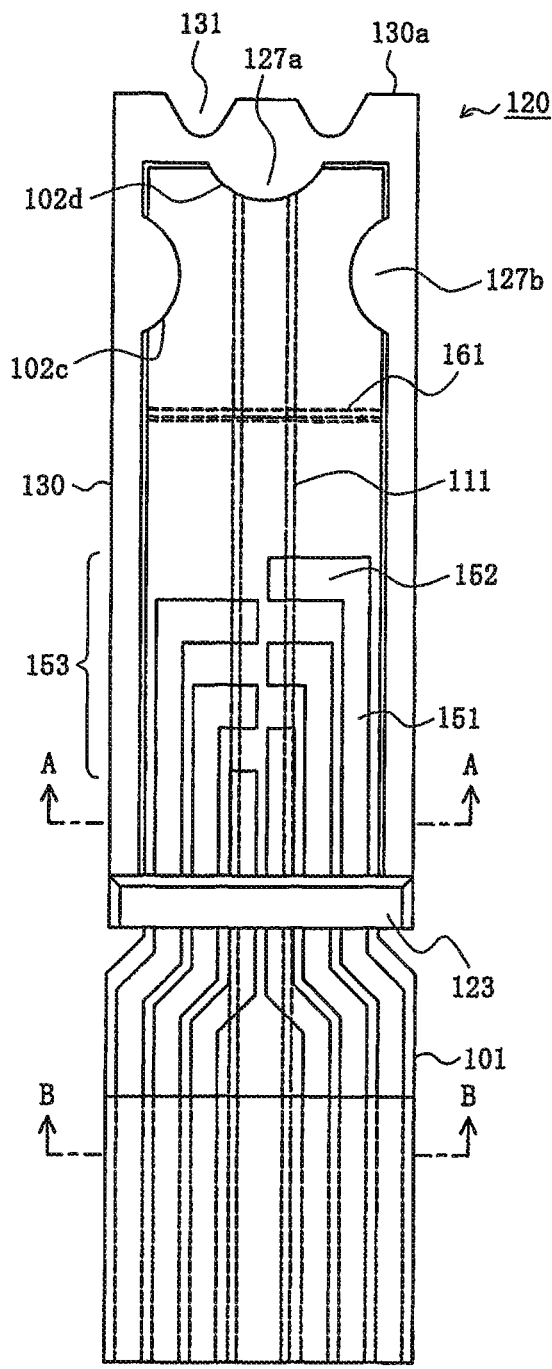
FIG. 3 is a bottom plan view of the plug and the cable of the Present Application.

Moreover, connection end portion 102 is a portion which is held by plug housing 130 so as to be unbendable and which does not require bendability. Therefore, in connection end portion 102, the pitch of conductive wires 151 can be reduced so that core portions 111 and any of conductive wires 151 overlap with each other, whereby the width of cable 101 can be reduced. Therefore, as illustrated in FIG. 3, the width of plug housing 130 can be reduced to be equal to the width of the wiring portion of cable 101. Accordingly, plug 120 can be reduced in its entire size with a small width, and hence, the optical connector assembly can be reduced in its entire size. Moreover, even when cable 101 is used in an electronic device or apparatus in which a casing is divided into a plurality of parts, and neighboring ones of the division parts are rotatably connected with each other, so that cable 101 is wired so as to pass through an inside of a hinge portion that rotatably connects the respective neighboring division parts, since the width of plug 120 at the front end thereof is small, the wiring operation is facilitated, and thus it is possible to perform the wiring operation in a simple manner.

Figure 5:
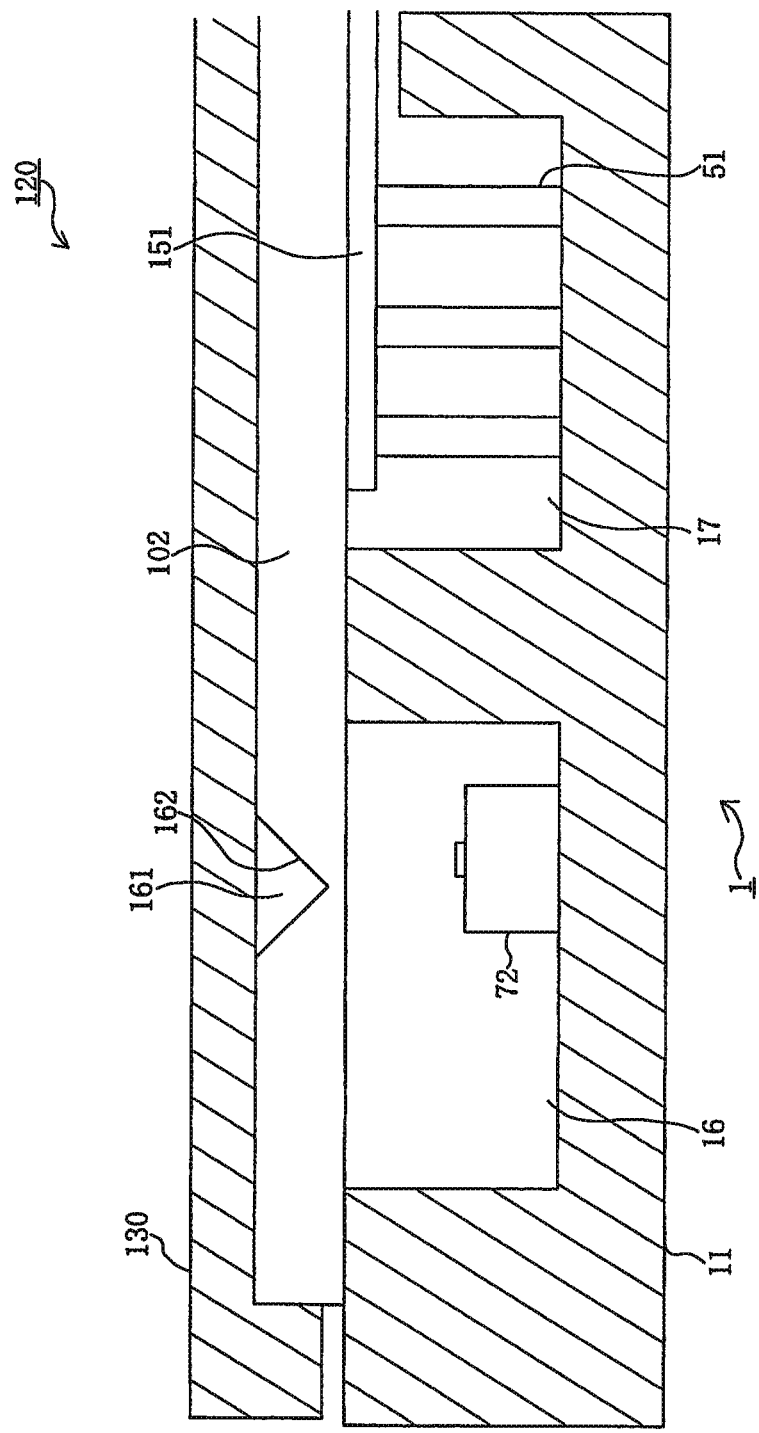
FIG. 5 is a schematic side sectional view illustrating the connection relationship between the connection end portion of a cable and an optical connection portion and an electric connection portion of a receptacle connector of the Present Application.

Next, a description of the connection relationship between connection end portion 102 of cable 101 and optical connection portion 16 and electric connection portion 17 of receptacle connector 1 will be provided in detail. Since front end portion 130a of plug housing 130 is engaged with rear end portion 18a of abutting portion 18 of connector housing 11 in a state where plug 120 is connected to receptacle connector 1, the position of plug 120 relative to connector housing 11 is fixed with respect to the axial direction and the width direction of cable 101. Therefore, as will be understood from FIG. 5, in a state where plug 120 is connected to receptacle connector 1, optical path conversion portion 161 of plug 120 is disposed at a position right above optical semiconductor device 72 received in optical connection portion 16 of receptacle connector 1. Moreover, with respect to the width direction of cable 101, optical path conversion portion 161 of plug 120 is disposed at a position right above optical semiconductor device 72. Owing to this configuration, cable 101 and receptacle connector 1 are optically connected with each other.

That is, light emitted from a light emitting surface of optical semiconductor device 72 is incident onto cable 101 from the lower side thereof, reflected from slope surface 162 disposed close to the rear side of optical path conversion portion 161, introduced to core portion 111 while changing a traveling direction thereof to about a right angle, and transmitted through core portion 111 along the axial direction of cable 101. On the other hand, light transmitted through core portion 111 along the axial direction of cable 101 is reflected from slope surface 162 disposed close to the rear side of optical path conversion portion 161, emitted toward the lower side from the lower surface of cable 101 while changing a traveling direction thereof to about a right angle, and received by a light receiving surface of optical semiconductor device 72.

In addition, plug-side electric connection portion 153 of plug 120 is disposed at a position right above electric connection portion 17 of receptacle connector 1, and respective connection pad portions 152 are brought into electrical contact with the contact portions of corresponding ones electric connection terminal 51 received in electric connection portion 17.

Figure 6:
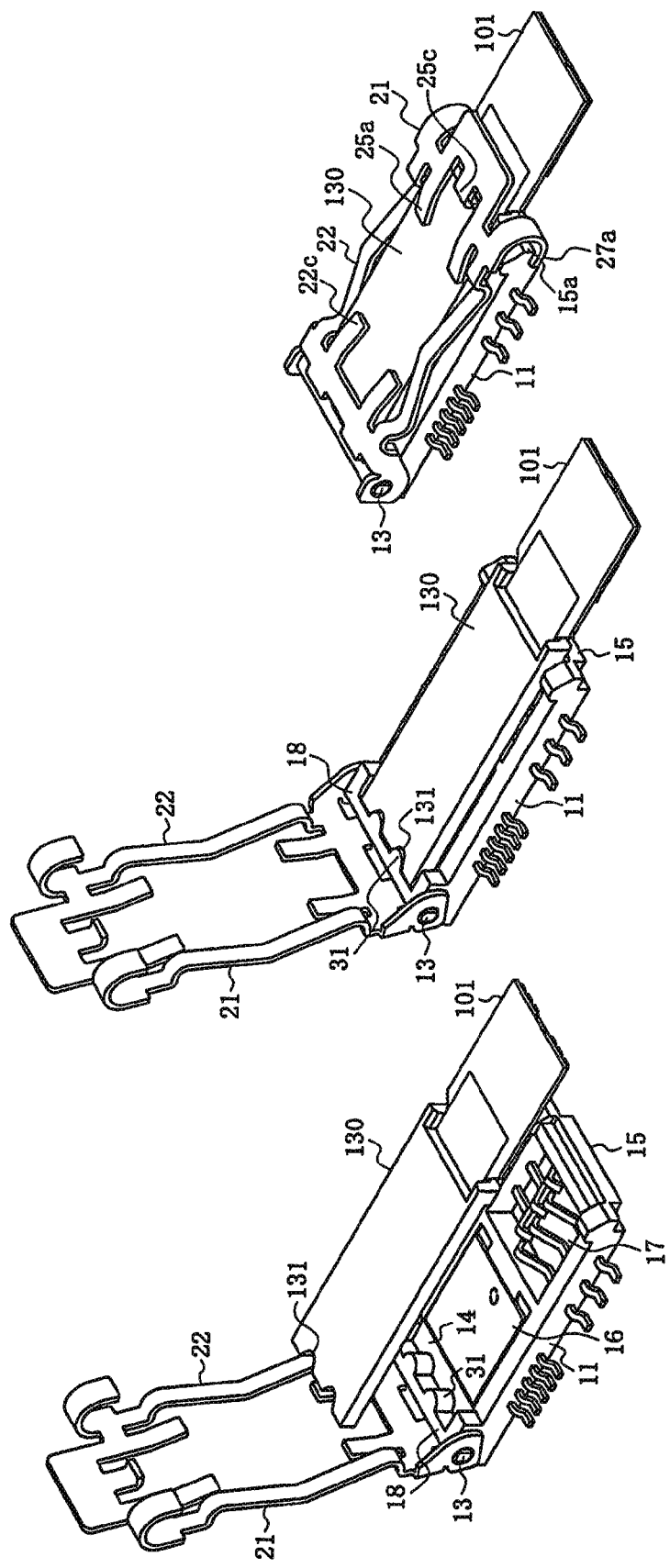
FIGS. 6A-C are views illustrating a series of perspective views of the operation of engaging the plug with the receptacle connector, according to the Present Application.
Figure 7:
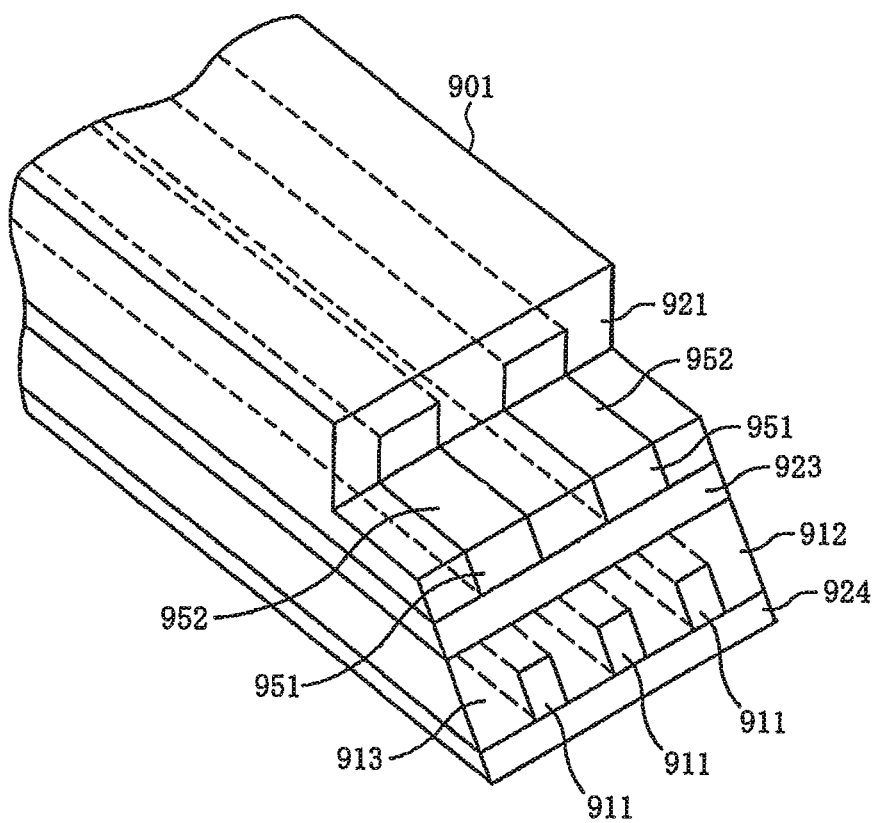
FIG. 7 is a perspective view of a conventional cable.

Next, a description of the operation of connecting cable 101 to receptacle connector 1 by fitting plug 120 engaged with receptacle connector 1 will be provided. First, as illustrated in FIG. 6A, lock member 21 of receptacle connector 1 is moved to the open position so that plug 120 is positioned above connector housing 11. In this case, the lower surface of plug 120, that is, the exposed surface of connection pad portions 152 is positioned so as to oppose the upper surface of connector housing 11. At the same time, front crossbar portion 122 of plug 120 is positioned right above guide portion 14 of connector housing 11, and rear crossbar portion 123 of plug 120 is positioned at a rear upper side of rear-end wall portion 15 of connector housing 11.

Subsequently, plug 120 is lowered relative to connector housing 11 so as to be engaged, by fitting, with connector housing 11. In this case, plug 120 is lowered in such a state that front end portion 130a of plug housing 130 is positioned at a slightly rear side rather than rear end portions 18a of abutting portions 18 of connector housing 11 and that concave portions 131 oppose corresponding convex portions 31. When plug 120 is placed on connector housing 11, plug 120 is moved toward the front end of connector housing 11 to be more compressed. With this operation, as illustrated in FIG. 6B, front end portions 130a of plug housing 130 are engaged with rear end portions 18a of abutting portion 18 of connector housing 11, and the positioning of plug 120 relative to connector housing 11 is achieved. In this case, concave portions 131 are engaged with convex portions 31, so that front end portions 130a and rear end portions 18a are in a multi-point contact state at three or more points. As a result, the positioning of plug 120 relative to connector housing 11 is achieved with high precision with respect to the axial direction, the width direction of cable 101 and the Z-axis direction.

Subsequently, the position of lock member 21 is changed from the open position: specifically, lock member 21 is rotated in the clockwise direction in the drawing figures about rotation shaft 13, so that lock member 21 reaches a position above plug 120. When lock member 21 is further rotated from this state, distal end portions 27a of latching arm parts 27 of lock member 21 are brought into tight contact with the upper surfaces; that is, tapered surfaces 15b of lock projections 15a of connector housing 11.

When lock member 21 is further rotated so that latching arm parts 27 are moved downwardly, distal end portions 27a are slid along tapered surfaces 15b, and thus, latching arm parts 27 are displaced in a direction away from rotation shaft 13. Then, bent portion 22a is elastically deformed and hence flexible portion 22 having elastic properties is expanded. When distal end portions 27a of latching arm parts 27 of lock member 21 are brought into tight contact with the apex portions of lock projections 15a of connector housing 11, flexible portion 22 is in its most expanded state.

Moreover, when lock member 21 is further rotated from the above-described state so that latching arm parts 27 are further moved downwardly, distal end portions 27a are separated from the apex portions of lock projections 15a to be inserted into concave latching portions 15c on the lower surface side of lock projections 15a. Moreover, bent portion 22a restores its original shape by a spring's restoring force so that flexible portion 22 is contracted to restore its original shape. Furthermore, distal end portions 27a are engaged with the lower surfaces of lock projections 15a. In this way, lock member 21 is latched to connector housing 11 at the closed position as illustrated in FIG. 6C so that plug 120 is locked.

In addition, since flexible portion 22 is extended and contracted to restore to its original shape, pressing portion 25c is displaced in the direction of rotation shaft 13 to be brought into tight contact with the pressed portion 130c of the plug housing 130, thereby pressing pressed portion 130c toward the distal end of connector housing 11 by an urging force as a spring force of bent portion 22a. Therefore, the entire body of plug 120 is pressed toward the distal end of connector housing 11 by lock member 21. As a result, since front end portion 130a and rear end portion 18a are in a multi-point contact state at three or more points, the position and the attitude of plug 120 relative to connector housing 11 can be stably maintained. In this manner, plug 120 is locked by being tightly fitted with receptacle connector 1, and thus, cable 101 is firmly connected to receptacle connector 1.

Furthermore, when the position of plug 120 relative to connector housing 11 is fixed, optical path conversion portion 161, as the plug-side optical connection portion, and plug-side electric connection portion 153 of plug 120 are positioned so as to oppose optical connection portion 16 and electric connection portion 17 of connector housing 11, respectively. Moreover, the position in the thickness direction of plug 120 is determined when the lower surface of front crossbar portion 122 is brought into tight contact with the upper surface of guide portion 14. In addition, front end portion 130a of plug housing 130 is engaged with rear end portion 18a of abutting portion 18 of connector housing 11. Furthermore, rear crossbar portion 123 in the vicinity of the rear end of plug 120 is engaged with rear end wall portion 15 of connector housing 11. Therefore, the positional relationship between plug 120 and connector housing 11 can be stably maintained. Owing to these configurations, the positional relationship is not disturbed even upon receipt of an unexpected external force.

As illustrated in FIG. 6C, it is necessary to unlock plug 120 in order to remove plug 120 from engagement with receptacle connector 1. In this case, the operator downwardly presses bent portions 22a of flexible portions 22. In this way, bent portions 22a are elastically deformed, and flexible portions 22 are expanded. As a result, distal end portions 27a of the latching arm parts 27 are displaced in the direction away from rotation shaft 13, and distal end portions 27a are disengaged from the lower surfaces of lock projections 15a. That is, the latched state between distal end portions 27a of latching arm parts 27 and concave latching portions 15c is released. Moreover, pressing portion 25c is separated apart from pressed portion 130c, and plug 120 is released from the state where the entire body thereof is pressed toward the distal end of connector housing 11 by lock member 21.

In such a state, when the operator moves operation portion 25b toward the upper side, lock member 21 is rotated in the counter-clockwise direction about rotation shaft 13, so that latching arm parts 27 are moved upward. With this operation, plug 120 is unlocked.

As described above, the optical connector assembly includes cable 101 having laminated therein the optical waveguide and conductive wires 151; plug 120 having cable 101 connected thereto; and connector housing 11 configured to mount thereon plug 120. Cable 101 is provided with the wiring portion that is arranged so that core portions 111 of the optical waveguide and conductive wires 151 do not overlap with each other and connection end portion 102 that is connected to be integral with the end portion in the axial direction of the wiring portion and is arranged so that at least a portion of core portions 111 of the optical waveguide overlaps with at least a portion of conductive wires 151. Moreover, plug 120 is provided with plug housing 130 which has the plug-side guide portion and holds connection end portion 102 so as to be unbendable. Furthermore, connector housing 11 is provided with the connector-side guide portion; and, the plug-side guide portion is configured to be engaged with the connector-side guide portion to achieve the positioning of plug 120 and connector housing 11.

Due to such a configuration, it is possible to improve the bendability of cable 101 and decrease the width thereof. Therefore, it is possible to reduce the size of the optical connector assembly, increase the durability thereof, simplify the structure thereof, decrease the production cost, and facilitate the operability thereof. Moreover, the width of the wiring portion is larger than the width of connection end portion 102. That is to say, since the width of connection end portion 102 can be reduced, plug 120 can be reduced in its entire size with a small width, and accordingly, the optical connector assembly can be reduced in its entire size. Furthermore, the width of plug housing 130 is equal to the width of the wiring portion. Therefore, even when cable 101 is wired in a small space, since the width of plug housing 130 located at the front end of cable 101 is equal to the width of the wiring portion at the rear thereof, the wiring operation is facilitated, and thus it is possible to perform the wiring operation in a simple manner. Furthermore, plug 120 is provided with optical path conversion portion 161 and plug-side electric connection portion 153. Connector housing 11 is provided with the optical connection portion 16 and electric connection portion 17. When plug 120 is mounted on the connector housing 11, optical path conversion portion 161 and plug-side electric connection portion 153 oppose optical connection portion 16 and electric connection portion 17. Due to such a configuration, plug 120 can be reduced in its entire size, and it is thus possible to perform a wiring operation of cable 101 in an extremely simple manner. Moreover, plug 120 can be securely engaged, and thus, it is possible to attain secure optical and electric connection with cable 101. Furthermore, since cable 101 is integrally formed by laminating therein the optical waveguide and conductive wires 151, it is not necessary to wire the optical waveguide and conductive wires 151 in an individual manner, and thus, the wiring operation is made easy.

While a preferred embodiment of the Present Application is shown and described, it is envisioned that those skilled in the art may devise various modifications without departing from the spirit and scope of the foregoing Description and the appended Claims.

What is claimed is:

1. An optical connector assembly, the optical connector assembly comprising:
    a cable, the cable including an optical waveguide laminated therein and conductive wires, the cable including a wiring portion, the wiring portion arranged so that a core portion of the optical waveguide and the conductive wires do not overlap and a connection end portion, integral with an end portion in an axial direction of the wiring portion, is arranged so that at least a portion of the core portion overlaps with at least a portion of the conductive wires;
    a plug connected to the cable, the plug including a plug housing, the plug housing including a plug-side guide portion, the plug housing holding the connection end portion so as to be unbendable; and
    a connector housing, the connector housing configured to mount thereon the plug, the connector housing including a connector-side guide portion;
    wherein the plug-side guide portion engages the connector-side guide portion to achieve a positioning of the plug and the connector housing.

2. The optical connector assembly of claim 1, wherein a width of the wiring portion is larger than a width of the connection end portion.

3. The optical connector assembly of claim 2, wherein a width of the plug housing is equal to a width of the wiring portion.

4. The optical connector assembly of claim 3, wherein the plug includes a plug-side optical connection portion and a plug-side electric connection portion.

5. The optical connector assembly of claim 1, wherein a width of the plug housing is equal to a width of the wiring portion.

6. The optical connector assembly of claim 5, wherein the plug includes a plug-side optical connection portion and a plug-side electric connection portion.

7. The optical connector assembly of claim 1, wherein the plug includes a plug-side optical connection portion and a plug-side electric connection portion.

8. The optical connector assembly of claim 2, wherein the plug includes a plug-side optical connection portion and a plug-side electric connection portion.

9. A cable for use with an optical connector assembly, the optical connector assembly comprising:
    a cable, the cable including an optical waveguide laminated therein and conductive wires, the cable including a wiring portion, the wiring portion arranged so that a core portion of the optical waveguide and the conductive wires do no overlap and a connection end portion, integral with an end portion in an axial direction of the wiring portion, is arranged so that at least a portion of the core portion overlaps with at least a portion of the conductive wires;
    a plug connected to the cable; and
    a connector housing, the connector housing configured to mount thereon the plug.

10. The cable for use with an optical connector assembly of claim 9, wherein a width of the wiring portion is larger than a width of the connection end portion.

11. A plug for use with an optical connector assembly, the optical connector assembly comprising:
    a cable, the cable including an optical waveguide laminated therein and conductive wires, the cable including a wiring portion, the wiring portion arranged so that a core portion of the optical waveguide and the conductive wires do no overlap and a connection end portion, integral with an end portion in an axial direction of the wiring portion, is arranged so that at least a portion of the core portion overlaps with at least a portion of the conductive wires;
    a plug connected to the cable, the plug including a plug housing, the plug housing including a plug-side guide portion, the plug housing holding the connection end portion so as to be unbendable; and
    a connector housing, the connector housing configured to mount thereon the plug.

12. The plug for use with an optical connector assembly of claim 11, wherein a width of the plug housing is equal to a width of the wiring portion.

13. The optical connector assembly of claim 4, wherein the connector housing includes an optical connection portion and an electric connection portion.

14. The optical connector assembly of claim 13, wherein, when the plug is mounted on the connector housing, the plug-side optical connection portion and the plug-side electric connection portion oppose the optical connection portion and the electric connection portion, respectively.

15. The optical connector assembly of claim 6, wherein the connector housing includes an optical connection portion and an electric connection portion.

16. The optical connector assembly of claim 15, wherein, when the plug is mounted on the connector housing, the plug-side optical connection portion and the plug-side electric connection portion oppose the optical connection portion and the electric connection portion, respectively.

17. The optical connector assembly of claim 7, wherein the connector housing includes an optical connection portion and an electric connection portion.

18. The optical connector assembly of claim 17, wherein, when the plug is mounted on the connector housing, the plug-side optical connection portion and the plug-side electric connection portion oppose the optical connection portion and the electric connection portion, respectively.

19. The optical connector assembly of claim 8, wherein the connector housing includes an optical connection portion and an electric connection portion.

20. The optical connector assembly of claim 19, wherein, when the plug is mounted on the connector housing, the plug-side optical connection portion and the plug-side electric connection portion oppose the optical connection portion and the electric connection portion, respectively.

\* \* \* \* \*